(12) United States Patent
He et al.

(10) Patent No.: US 11,416,287 B2
(45) Date of Patent: Aug. 16, 2022

(54) METHOD FOR PROCESSING PARALLEL TASKS IN UNMANNED VEHICLE SYSTEM, AND UNMANNED VEHICLE SYSTEM

(71) Applicant: BAIDU ONLINE NETWORK TECHNOLOGY (BEIJING) CO., LTD., Beijing (CN)

(72) Inventors: Wei He, Beijing (CN); Zhuo Chen, Beijing (CN); Baisheng Wang, Beijing (CN); Kaiwen Feng, Beijing (CN); Ronggui Peng, Beijing (CN); Chao Zhang, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 129 days.

(21) Appl. No.: 16/551,181

(22) Filed: Aug. 26, 2019

(65) Prior Publication Data
US 2020/0073711 A1  Mar. 5, 2020

(30) Foreign Application Priority Data
Aug. 30, 2018  (CN) .......................... 201811005573.8

(51) Int. Cl.
*G06F 9/46* (2006.01)
*G06F 9/48* (2006.01)
(Continued)

(52) U.S. Cl.
CPC .......... *G06F 9/4881* (2013.01); *G05D 1/0088* (2013.01); *G06F 9/3851* (2013.01); *G06F 9/545* (2013.01)

(58) Field of Classification Search
CPC ...... G06F 9/4881; G06F 9/3851; G06F 9/545; G05D 1/0088
See application file for complete search history.

(56) References Cited

U.S. PATENT DOCUMENTS 6,654,781 B1 * 11/2003 Browning ............. G06F 9/4843
  711/147
9,037,152 B1 * 5/2015 Herrera ................. H04W 64/00
  455/456.1
(Continued)

FOREIGN PATENT DOCUMENTS

CN  106133689 A  11/2016
CN  106980546 A  7/2017

OTHER PUBLICATIONS

Pineda et al. ("User-Kernel Reactive Threads for Linux", In: The 7th World Multiconference on Systemics, Cybernetics and Informatics, 2003) (Year: 2003).*
(Continued)

*Primary Examiner* — Wissam Rashid
(74) *Attorney, Agent, or Firm* — Lathrop GPM LLP

(57) ABSTRACT

Embodiments of the present disclosure provide a method and a coroutine framework for processing parallel tasks, a device, a medium and an unmanned vehicle. The method includes: switching a current coroutine to a target coroutine in response to a task switching instruction, in which, the coroutine is created at a user layer for processing a task, and the coroutine at the user layer is executed by a thread at a kernel layer; and saving context of a task processed by the current coroutine, and reading context of a task processed by the target coroutine, such that the thread at the kernel layer corresponding to the target coroutine processes the task based on the context of the target coroutine when executing the target coroutine.

12 Claims, 2 Drawing Sheets

--- switching a current coroutine to a target coroutine in response to a task switching instruction, wherein, the coroutine is created at a user layer for processing a task, and the coroutine at the user layer is executed by a thread at a kernel layer  ⟶ S110 saving context of a task processed by the current coroutine, and reading context of a task processed by the target coroutine, such that the thread at the kernel layer corresponding to the target coroutine processes the task based on the context of the target coroutine when executing the target coroutine  ⟶ S120

(51) Int. Cl.
*G05D 1/00* (2006.01)
*G06F 9/38* (2018.01)
*G06F 9/54* (2006.01)

(56) References Cited

U.S. PATENT DOCUMENTS

2010/0011142 A1* 1/2010 Bogenberger .......... G06F 13/24
  710/260
2015/0220352 A1 8/2015 Wilson
2019/0347129 A1* 11/2019 Huang .................... G06F 9/545

OTHER PUBLICATIONS

Chinese Patent Application No. 201811005573.8 Second Office Action dated Sep. 4, 2020, 7 pages.
Chinese Patent Application No. 201811005573.8 English translation of Second Office Action dated Sep. 4, 2020, 7 pages.
Chinese Patent Application No. 201811005573.8 Third Office Action dated Nov. 25, 2020, 6 pages.
Chinese Patent Application No. 201811005573.8 English translation of Third Office Action dated Nov. 25, 2020, 6 pages.
Microsoft Visual J++98 Ace to crash, Master crash series, 1999, pp. 55-57.
English translation of Microsoft Visual J++98 Ace to crash, Master crash series, 1999, pp. 55-57.
Proficient in Java programming under JBuilder3 environment, Ruisi Workshop, 2000, pp. 229-230.
English translation of Proficient in Java programming under JBuilder3 environment, 2000, pp. 229-230.
Zhang Guizhu, editor in chief, Java object-oriented programming ($4^{th}$ edition) 2015, Chapter 11, Multithreading, pp. 209-213.
Zhang Guizhu, editor in chief, English translation of Java object-oriented programming ($4^{th}$ edition) 2015, Chapter 11, Multithreading, pp. 209-213.
Zhang Guizhu, editor in chief, Solution and experiment of Java object-oriented programming Problem solving and experiments ($4^{th}$ edition), Chapter 11, Multithreading, pp. 57-58.
Zhang Guizhu, editor in chief, English translation of Solution and experiment of Java object-oriented programming exercises ($4^{th}$ edition) 2015, Chapter 11, Multithreading, pp. 57-58.
Kylix programming—a practical tutorial, Edited by Qiao Lin, 2000, pp. 400-403.
English translation of Kylix programming—a practical tutorial, Edited by Qiao Lin, 2000, pp. 400-403.
Chinese Patent Application No. 201811005573.8 English translation of Office Action dated Mar. 16, 2020, 7 pages.
Chinese Patent Application No. 201811005573.8 Office Action dated Mar. 16, 2020, 6 pages.

* cited by examiner

METHOD FOR PROCESSING PARALLEL
TASKS IN UNMANNED VEHICLE SYSTEM,
AND UNMANNED VEHICLE SYSTEM

CROSS REFERENCE TO RELATED APPLICATION

This application claims priority to Chinese Patent Application No. 201811005573.8, filed with the State Intellectual Property Office of P. R. China on Aug. 30, 2018, the entire contents of which are incorporated herein by reference.

FIELD

Embodiments of the present disclosure relate to a field of unmanned vehicle technologies, and more particularly to a method and a coroutine framework for processing parallel tasks, a device, a medium and an unmanned vehicle.

BACKGROUND

With development of the technology, more and more tools in life tend to be intelligent, and more particularly, research of unmanned vehicles will provide great convenience for human life in the further.

There is a large amount of complex and parallel computing tasks in an unmanned vehicle system. For the large amount of parallel computing tasks, a conventional way is to employ multiple threads for parallel execution, that is, each kernel executes one thread task, and when the execution for the thread task in the kernel is completed, the kernel is switched to another thread and executes another thread task continuously. However, in such conventional multi-thread solution, there are disadvantages in a kernel layer that switching among the threads has a considerable overhead and task parallelism is insufficient. Vehicle hardware, such as a vehicle computer, has limited parallelism and execution resources, as well as insufficient computing capability. Therefore, performance and extensibility of on-vehicle computing are severely limited.

SUMMARY

The present disclosure provides a method and a coroutine framework for processing parallel tasks, a device, a medium and an unmanned vehicle.

In a first aspect, embodiments of the present disclosure provide a method for processing parallel tasks. The method includes: switching a current coroutine to a target coroutine in response to a task switching instruction, in which, the coroutine is created at a user layer for processing a task, and the coroutine at the user layer is executed by a thread at a kernel layer; and saving context of a task processed by the current coroutine, and reading context of a task processed by the target coroutine, such that the thread at the kernel layer corresponding to the target coroutine processes the task based on the context of the target coroutine when executing the target coroutine.

In a second aspect, embodiments of the present disclosure further provide a coroutine framework. The coroutine framework includes a switching module and a context-information maintaining module.

The switching module is configured to switch among different coroutines in response to a task switching instruction. The coroutine is created at a user layer for processing a task, and the coroutine at the user layer is executed by a thread at a kernel layer.

The context-information maintaining module is configured to maintain context of a task processed by the coroutine in an internal data structure of the coroutine framework.

In a third aspect, embodiments of the present disclosure further provide an electronic device. The electronic device includes one or more processors and a memory. The memory is configured to store one or more programs. When the one or more programs are executed by the one or more processors, the one or more processors are caused to implement the method for processing parallel tasks according to any embodiment of the present disclosure.

In a fourth aspect, embodiments of the present disclosure further provide a computer-readable storage medium having a computer program stored thereon. The computer program is configured to implement the method for processing parallel tasks according to any embodiment of the present disclosure when executed by a processor.

In a fifth aspect, embodiments of the present disclosure further provide an unmanned vehicle. The unmanned vehicle includes a vehicle body, and the electronic device according to any embodiment of the present disclosure. The electronic device has the coroutine framework according to any embodiment of the present disclosure configured thereon.

DETAILED DESCRIPTION

Detailed description will be further made below to the present disclosure with reference to the accompanying drawings and the embodiments. It should be understood that, detailed embodiments described herein are intended only to explain the present disclosure, and are not intended to limit the present disclosure. In addition, it should be further noted that, for the convenience of description, only some contents but not all of the structure related to the present disclosure are illustrated in the accompanying drawings.

Identifying movement of objects in a real scenario has use in the field of unmanned vehicles. An unmanned vehicle, also called as a Driverless Car, refers to a smart vehicle that is almost sentient, or contains some semblance of artificial intelligence or at least sensors and controllers that actuate brakes and wheels based on outside events. The unmanned vehicle as a wheeled mobile robot relies on computer systems and on-board devices installed in the vehicle to achieve a goal of driving the vehicle without drivers.

Embodiment 1

Figure 1:
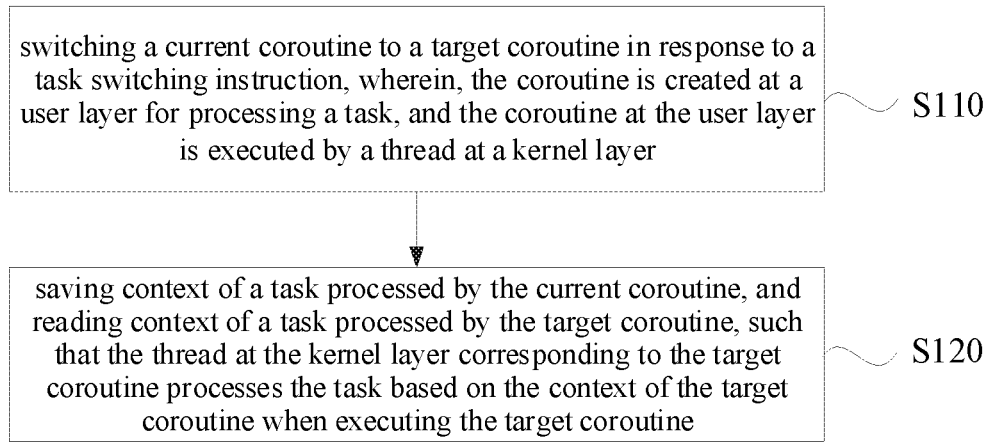
FIG. 1 is a flow chart illustrating a method for processing parallel tasks provided in Embodiment 1 of the present disclosure.

FIG. 1 is a flow chart illustrating a method for processing parallel tasks provided in Embodiment 1 of the present disclosure. This embodiment may be applicable to a case of implementing a computing task for fast switching of an unmanned vehicle in user space. The method may be executed by a coroutine framework. The coroutine framework may be implemented in form of software and/or hardware, and may be configured in an electronic device. The electronic device may be configured in a vehicle, such as an unmanned vehicle with control and computing capability. Referring to FIG. 1, the method includes following blocks in detail.

At block S110, a current coroutine is switched to a target coroutine in response to a task switching instruction. The coroutine is created at a user layer for processing a task, and the coroutine at the user layer is executed by a thread at a kernel layer.

There is a great amount of complex and parallel computing tasks to be processed in an unmanned vehicle system. Directly switching among the threads at the kernel layer has a considerable overhead. Moreover, the number of kernels in the unmanned vehicle system is limited, and thus task parallelism is insufficient. Therefore, in order to avoid the switching among the threads at the kernel layer, each kernel executes one fixed thread. For each thread at the kernel layer, a plurality of corresponding coroutines for processing the tasks are created at the user layer. The user layer is a space where an application runs. The plurality of coroutines at the user layer are executed successively by a corresponding thread at the kernel layer, and switching among the plurality of coroutines is controlled by the coroutine framework to process the parallel tasks. For example, the unmanned vehicle system includes 10 kernels numbering 1-10. For example, for the thread of the kernel numbering 1, 100 corresponding coroutines are established at the user layer, and the coroutines are executed by the thread of the kernel. Therefore, by switching among the 100 coroutines, parallel processing or computing of tasks corresponding to different coroutines may be implemented by the thread of the kernel.

When the current coroutine is executed by the thread at the kernel layer, following conditions may be occurred. 1) When the current coroutine is executed, there is no need to perform processing by a CPU (central processing unit), for example, using an I/O (Input/Output) interface or waiting for network. 2) When the current coroutine is executed, a system scheduling layer sends a task of which a priority is greater than the current coroutine. 3) Execution of the current coroutine is completed. If any of the above conditions occurs, the coroutine framework stops the current coroutine task through a pause interface in the coroutine, and meanwhile, sends the task switching instruction through a switching interface, for switching the current coroutine to the target coroutine. The target coroutine is a coroutine with a highest priority among coroutines other than the current coroutine at the user layer. The priority of each coroutine is determined by the scheduling layer according to a service feature.

At block S120, context of a task processed by the current coroutine is saved, and context of a task processed by the target coroutine is read, such that the thread at the kernel layer corresponding to the target coroutine processes the task based on the context of the target coroutine when executing the target coroutine.

In this embodiment, when the current coroutine task is stopped through the pause interface in the current coroutine, the context of the task processed by the current coroutine is saved. The purpose is to ensure that, in a case that execution for the current coroutine is not completed and is switched to another coroutine, the task of the current coroutine may be processed continuously based on the saved context when execution is switched back to the current coroutine subsequently. Moreover, the context of the task processed by the target coroutine is read, such that the thread at the kernel layer corresponding to the target coroutine processes the task based on the context of the target coroutine when executing the target coroutine. The context includes a register state and stack information required by the thread at the kernel layer for processing the task.

In embodiments of the present disclosure, for respective thread of each kernel at the kernel layer, a plurality of coroutines for executing tasks are respectively created at the user layer, and by switching among the plurality of coroutines to process parallel tasks, directly switching among the threads at the kernel layer is avoided. Switching among the threads at the kernel layer has a considerable overhead, while switching among the coroutines created at the user layer has a relatively small overhead, which merely needs to maintain necessary context information. Therefore, the overall computing performance of the system is improved.

Embodiment 2

Figure 2:
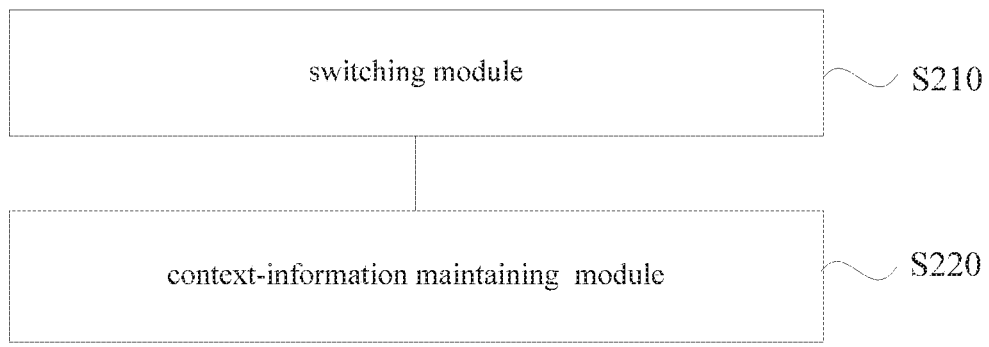
FIG. 2 is a block diagram illustrating a coroutine framework provided in Embodiment 2 of the present disclosure.

FIG. 2 is a block diagram illustrating a coroutine framework provided in Embodiment 2 of the present disclosure. Referring FIG. 2, the coroutine framework includes a switching module 210 and a context-information maintaining module 220.

The switching module 210 is configured to switch among different coroutines in response to a task switching instruction. The coroutine is created at a user layer for processing a task, and the coroutine at the user layer is executed by a thread at a kernel layer.

The context-information maintaining module 220 is configured to maintain context of a task processed by the coroutine in an internal data structure of the coroutine framework.

In this embodiment, for respective thread of each kernel at the kernel layer, a plurality of coroutines for executing tasks are respectively created at the user layer, and by switching among the plurality of coroutines through the switching module to process parallel tasks, and by maintaining the context of the task processed by the coroutine in the internal data structure of the coroutine framework through the context-information maintaining module, directly switching among the threads at the kernel layer is avoided. Switching among the threads at the kernel layer has a considerable overhead, while switching among the coroutines created at the user layer has a relatively small overhead, which merely needs to maintain necessary context information. Therefore, the overall computing performance of the system is improved.

Further, the context information maintaining module includes: a saving unit and a recovery unit.

The saving unit is configured to save context of a current coroutine.

The recovery unit is configured to read and recover context of a target coroutine.

Further, the context includes a register state and stack information required by the thread at the kernel layer for processing the task.

The coroutine framework provided in this embodiment may execute the method for processing parallel tasks provided in any embodiment of the present disclosure, and has function modules and beneficial effects corresponding to executing the method.

Embodiment 3

Figure 3:
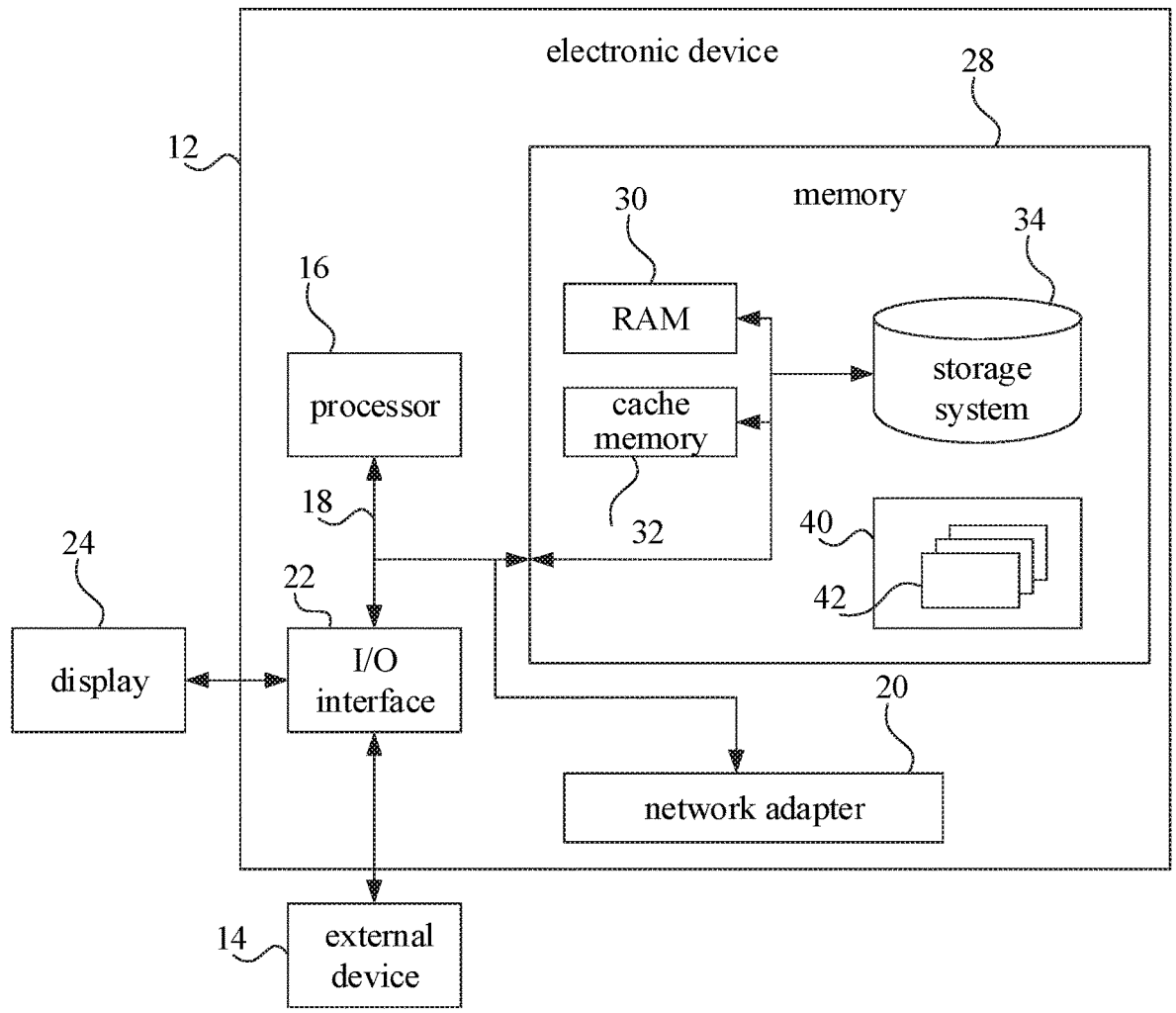
FIG. 3 is a schematic diagram illustrating an electronic device provided in Embodiment 3 of the present disclosure.

FIG. 3 is a schematic diagram illustrating an electronic device provided by Embodiment 3 of the present disclosure. FIG. 3 illustrates a block diagram of an exemplary electronic device 12 applicable to implement embodiments of the present disclosure. The electronic device 12 illustrated in FIG. 3 is only an example, which may not bring any limitation to functions and scope of embodiments of the present disclosure.

As illustrated in FIG. 3, the electronic device 12 is embodied in the form of a general-purpose computing device. Components of the electronic device 12 may include but not limited to: one or more processors or processing units 16, a memory 28, and a bus 18 connecting different system components (including the memory 28 and the processor 16).

The bus 18 represents one or more of several bus structures, including a storage bus or a storage controller, a peripheral bus, an accelerated graphics port, a processor or a local bus with any bus structure in the plurality of bus structures. For example, these architectures include but not limited to an industry standard architecture (ISA) bus, a micro channel architecture (MAC) bus, an enhanced ISA bus, a video electronics standards association (VESA) local bus and a peripheral component interconnection (PCI) bus.

The electronic device 12 typically includes a plurality of computer system readable mediums. These mediums may be any usable medium that may be accessed by the electronic device 12, including volatile and non-volatile mediums, removable and non-removable mediums.

The system memory 28 may include computer system readable mediums in the form of volatile medium, such as a random access memory (RAM) 30 and/or a cache memory 32. The electronic device 12 may further include other removable/non-removable, volatile/non-volatile computer system storage mediums. Only as an example, the storage system 34 may be configured to read from and write to non-removable, non-volatile magnetic mediums (not illustrated in FIG. 3, and usually called "a hard disk driver"). Although not illustrated in FIG. 3, a magnetic disk driver configured to read from and write to the removable non-volatile magnetic disc (such as "a diskette"), and an optical disc driver configured to read from and write to a removable non-volatile optical disc (such as a CD-ROM, a DVD-ROM or other optical mediums) may be provided. Under these circumstances, each driver may be connected with the bus 18 by one or more data medium interfaces. The system memory 28 may include at least one program product. The program product has a set of program modules (for example, at least one program module), and these program modules are configured to execute functions of respective embodiments of the present disclosure.

A program/utility tool 40, having a set (at least one) of program modules 42, may be stored in the system memory 28. Such program modules 42 include but not limited to an operating system, one or more application programs, other program modules, and program data. Each or any combination of these examples may include an implementation of a networking environment. The program module 42 usually executes functions and/or methods described in embodiments of the present disclosure.

The electronic device 12 may communicate with one or more external devices 14 (such as a keyboard, a pointing device, and a display 24), may further communicate with one or more devices enabling a user to interact with the electronic device 12, and/or may communicate with any device (such as a network card, and a modem) enabling the electronic device 12 to communicate with one or more other computing devices. Such communication may occur via an Input/Output (I/O) interface 22. Moreover, the electronic device 12 may further communicate with one or more networks (such as local area network (LAN), wide area network (WAN) and/or public network, such as Internet) via a network adapter 20. As illustrated in FIG. 3, the network adapter 20 communicates with other modules of the electronic device 12 via the bus 18. It should be understood that, although not illustrated in FIG. 3, other hardware and/or software modules may be used in combination with the electronic device 12, including but not limited to: microcode, device drivers, redundant processing units, external disk drive arrays, RAID (redundant array of independent disks) systems, tape drives, and data backup storage systems, etc.

The processor 16, by operating programs stored in the system memory 28, executes various function applications and data processing, for example implements a method for processing parallel tasks provided in embodiments of the present disclosure. The method includes:

switching a current coroutine to a target coroutine in response to a task switching instruction, in which, the coroutine is created at a user layer for processing a task, and the coroutine at the user layer is executed by a thread at a kernel layer; and saving context of a task processed by the current coroutine, and reading context of a task processed by the target coroutine, such that the thread at the kernel layer corresponding to the target coroutine processes the task based on the context of the target coroutine when executing the target coroutine.

Embodiment 4

Embodiment 4 of the present disclosure provides a storage medium including computer executable instructions. When executed by a computer processor, the computer executable instructions are configured to execute a method for processing parallel tasks. The method includes:

switching a current coroutine to a target coroutine in response to a task switching instruction, in which, the coroutine is created for processing a task at a user layer, and the coroutine at the user layer is executed by a thread at a kernel layer; and saving context of a task processed by the current coroutine, and reading context of a task processed by the target coroutine, such that the thread at the kernel layer corresponding to the target coroutine processes the task based on the context of the target coroutine when executing the target coroutine.

Certainly, in the storage medium including the computer executable instructions provided by embodiments of the present disclosure, the computer executable instructions are not limited to the method operations described above, which may also execute related operations in the method for processing parallel tasks provided by any embodiment of the present disclosure.

The computer storage medium in embodiments of the present disclosure may employ any combination of one or more computer readable mediums. The computer readable medium may be a computer-readable signal medium or a computer-readable storage medium. The computer-readable storage medium may be, for example, but not limited to an electronic, magnetic, optical, electromagnetic, infrared, or semiconductor system, apparatus or device, or any suitable combination of the foregoing. More specific examples (a non-exhaustive list) of the computer-readable storage medium may include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical memory device, a magnetic memory device, or any appropriate combination of the foregoing. In this document, the computer-readable storage medium can be any tangible medium that contains or stores a program. The program can be used by or in conjunction with an instruction execution system, apparatus or device.

The computer readable signal medium may include a data signal transmitted in the baseband or as part of a carrier, in which computer-readable program codes are carried. The transmitted data signal may employ a plurality of forms, including but not limited to an electromagnetic signal, a light signal or any suitable combination thereof. The computer-readable signal medium may further be any computer readable medium other than the computer-readable storage medium. The computer readable medium may send, propagate or transmit programs configured to be used by or in combination with an instruction execution system, apparatus or device.

The program codes included in the computer readable medium may be transmitted by any appropriate medium, including but not limited to wireless, electric wire, optical cable, RF (Radio Frequency), or any suitable combination of the foregoing.

The computer program codes for executing operations of the present disclosure may be programmed using one or more programming languages or the combination thereof. The programming languages include object-oriented programming languages, such as Java, Smalltalk, C++, and further include conventional procedural programming languages, such as the C programming language or similar programming languages. The program codes may be executed entirely on a user computer, partly on the user computer, as a stand-alone software package, partly on the user computer and partly on a remote computer, or entirely on the remote computer or server. In the scenario involving the remote computer, the remote computer may be connected to the user computer through any type of network, including a local area network (LAN) or a wide area network (WAN), or may be connected to an external computer (for example, through the Internet using an Internet service provider).

Embodiment 5

Embodiment 5 further provides an unmanned vehicle. The unmanned vehicle includes a vehicle body and the electronic device according to any embodiment of the present disclosure. The electronic device has a coroutine framework according to any embodiment of the present disclosure configured thereon. For example, the coroutine framework includes a switching module and a context-information maintaining module.

The switching module is configured to switch among different coroutines in response to a task switching instruction. The coroutine is created at a user layer for processing a task, and the coroutine at the user layer is executed by a thread at a kernel layer.

The context-information maintaining module is configured to maintain context of a task processed by the coroutine in an internal data structure of the coroutine framework.

The context-information maintaining module includes a saving unit and a recovery unit.

The saving unit is configured to save context of a current coroutine.

The recovery unit is configured to read and recover context of a target coroutine.

The above is only preferred embodiments of the present disclosure and technical principle applied thereto. It should be understood by the skilled in the art that, the present disclosure is not limited to the specific embodiment described herein. The skilled in the art may make various obvious changes, modifications and alternatives without departing from the scope of the present disclosure. Therefore, although a detailed illumination is made to the present disclosure by the above embodiments, the present disclosure is not merely limited to the above embodiments. More other equivalent embodiments may also be included without departing from the technical idea of the present disclosure. The scope of the present disclosure is determined by the appended claims.

What is claimed is:

1. A method for processing parallel tasks in an unmanned vehicle system, comprising:
   for each of threads at a kernel layer, creating a plurality of coroutines at a user layer where an application runs, wherein the thread at the kernel layer is configured to execute the plurality of coroutines for processing parallel tasks;
   for each of threads at a kernel layer, switching a current coroutine to a target coroutine among the plurality of coroutines in response to a task switching instruction; and
   saving context of a task processed by the current coroutine, and reading context of a task processed by the target coroutine, such that the thread at the kernel layer corresponding to the target coroutine processes the task based on the context of the target coroutine when executing the target coroutine;
   wherein switching the current coroutine to the target coroutine comprises:
   stopping the current coroutine through a pause interface and sending the task switching instruction through a switching interface, in response to using an Input/Output interface or waiting for network to cause a central processing unit not to perform processing the current coroutine; and
   switching the current coroutine to the target coroutine in response to the task switching instruction.

2. The method of claim 1, wherein, the context comprises a register state and stack information required by the thread at the kernel layer for processing the task.

3. The method of claim 1, wherein, the target coroutine has a highest priority among coroutines other than the current coroutine at the user layer.

4. The method of claim 1, further comprising:
   switching back to the current coroutine, and processing the task of the current coroutine according to the save context.

5. An electronic device in an unmanned vehicle system, comprising:
   one or more processors;
   a memory, configured to store one or more programs;
   when the one or more programs are executed by the one or more processors, the one or more processors are configured to:
   create a plurality of coroutines at a user layer where an application runs for each of threads at a kernel layer, wherein the thread at the kernel layer is configured to execute the plurality of coroutines for processing parallel tasks;
   switch a current coroutine to a target coroutine among the plurality of coroutines for each of threads at a kernel layer in response to a task switching instruction; and save context of a task processed by the current coroutine, and read context of a task processed by the target coroutine, such that the thread at the kernel layer corresponding to the target coroutine processes the task based on the context of the target coroutine when executing the target coroutine;

wherein the one or more processors are further configured to:

stop the current coroutine through a pause interface and sending the task switching instruction through a switching interface, in response to using an Input/Output interface or waiting for network to cause a central processing unit not to perform processing the current coroutine; and switch the current coroutine to the target coroutine in response to the task switching instruction.

6. The electronic device of claim 5, wherein, the context comprises a register state and stack information required by the thread at the kernel layer for processing the task.

7. The electronic device of claim 5, wherein, the target coroutine has a highest priority among coroutines other than the current coroutine at the user layer.

8. The electronic device of claim 5, wherein, the processor is further configured to: switch back to the current coroutine, and process the task of the current coroutine according to the save context.

9. An unmanned vehicle, comprising:
a vehicle body; and
an electronic device, wherein, the electronic device has a coroutine framework configured to:

create a plurality of coroutines at a user layer where an application runs for each of threads at a kernel layer, wherein the thread at the kernel layer is configured to execute the plurality of coroutines for processing parallel tasks;

switch among different coroutines for each of threads at a kernel layer in response to a task switching instruction; and maintain context of a task processed by the coroutine in an internal data structure of the coroutine framework;

wherein the coroutine framework is further configured to:

stop the current coroutine through a pause interface and sending the task switching instruction through a switching interface, in response to using an Input/Output interface or waiting for network to cause a central processing unit not to perform processing the current coroutine; and switch the current coroutine to the target coroutine in response to the task switching instruction.

10. The unmanned vehicle of claim 9, wherein the coroutine framework is further configured to:

save context of a current coroutine; and
read and recover context of a target coroutine.

11. The unmanned vehicle of claim 9, wherein the context comprises a register state and stack information required by the thread at the kernel layer for processing the task.

12. The unmanned vehicle of claim 9, wherein the target coroutine has a highest priority among coroutines other than the current coroutine at the user layer.

* * * * *